US012737780B2

(12) United States Patent
Tenneti et al.

(10) Patent No.: US 12,737,780 B2
(45) **Date of Patent: *Sep. 15, 2026**

(54) PROVIDING SEARCH SUGGESTIONS BASED ON PREVIOUS SEARCHES AND CONVERSIONS

(71) Applicant: Maplebear Inc., San Francisco, CA (US)

(72) Inventors: Tejaswi Tenneti, San Carlos, CA (US); Tyler Russell Tate, Lexington, KY (US); Jonathan Lennart Bender, San Francisco, CA (US); Shishir Kumar Prasad, Fremont, CA (US); Qingyuan Chen, San Francisco, CA (US)

(73) Assignee: Maplebear Inc., San Francisco, CA (US)

(*) Notice: Subject to any disclaimer, the term of this patent is extended or adjusted under 35 U.S.C. 154(b) by 133 days.

This patent is subject to a terminal disclaimer.

(21) Appl. No.: 18/954,374

(22) Filed: Nov. 20, 2024

(65) Prior Publication Data

US 2025/0078101 A1 Mar. 6, 2025

Related U.S. Application Data

(63) Continuation of application No. 17/486,395, filed on Sep. 27, 2021, now Pat. No. 12,175,482.

(Continued)

(51) Int. Cl.

*G06Q 10/00* (2026.01)
*G06F 16/901* (2019.01)

(Continued)

(52) U.S. Cl.

CPC ..... *G06Q 30/0201* (2013.01); *G06F 16/9024* (2019.01); *G06F 16/9535* (2019.01); *G06Q 30/0625* (2013.01)

(58) Field of Classification Search

None

See application file for complete search history.

(56) References Cited

U.S. PATENT DOCUMENTS 8,078,507 B1 12/2011 Rao et al.
8,832,132 B1 9/2014 Spertus et al.

(Continued)

FOREIGN PATENT DOCUMENTS

WO WO-2022/005511 A1 1/2022

OTHER PUBLICATIONS

B Adhikari, P Sondhi, W Zhang, M Sharma (Mining E-commerce query relations using customer interaction networks) . . .—Proceedings of the . . . , 2018—dl.acm.org (Year: 2018).*

(Continued)

*Primary Examiner* — Hafiz A Kassim

(74) *Attorney, Agent, or Firm* — Fenwick & West LLP

(57) ABSTRACT

An online concierge system suggests subsequent search queries based on previous search queries and whether the previous search queries resulted in conversions. The online concierge system trains a machine learning model using previous delivery orders and whether initial and subsequent search queries in the previous delivery orders resulted in conversions. When the online concierge system receives a search query to identify one or more items from a customer, the online concierge system parses the search query into combinations of terms and identifies items related to the search query. In response to the search query resulting in a conversion, the online concierge system retrieves a conversion graph and presents a suggested subsequent search query based on the conversion graph. In response to the search query not resulting in a conversion, the online concierge (Continued)

system retrieves a non-conversion graph and presents a suggested subsequent search query based on the non-conversion graph.

17 Claims, 7 Drawing Sheets

Related U.S. Application Data

(60) Provisional application No. 63/086,491, filed on Oct. 1, 2020.

(51) Int. Cl.
*G06F 16/9535* (2019.01)
*G06Q 30/0201* (2023.01)
*G06Q 30/0601* (2023.01)

(56) References Cited

U.S. PATENT DOCUMENTS 9,792,375 B2 10/2017 Gardner et al.
10,846,756 B2 11/2020 Varippyreddy et al.
10,956,521 B1 3/2021 Yu et al.
2005/0209909 A1* 9/2005 Dull .................. G06Q 30/0205 705/7.29
2006/0168572 A1* 7/2006 Backlund .................. G06F 8/65 717/137
2007/0061335 A1 3/2007 Ramer et al.
2007/0192289 A1* 8/2007 Lin .................. G06F 16/9537
2011/0071900 A1* 3/2011 Kamath .................. G06Q 30/02 705/14.46
2012/0036123 A1* 2/2012 Hasan .................. G06F 16/95 707/E17.084
2012/0323682 A1* 12/2012 Shanbhag .......... G06Q 30/0641 705/14.66
2013/0013372 A1 1/2013 Gomez Uribe et al.
2013/0085868 A1 4/2013 Jordan et al.
2013/0198030 A1 8/2013 Linden et al.
2013/0282734 A1* 10/2013 Sethi .................. G06Q 30/02 707/748
2013/0325837 A1* 12/2013 Soetarman ............ G06F 16/951 707/706
2014/0280007 A1* 9/2014 Gardner .............. G06F 16/9535 707/706
2016/0117322 A1* 4/2016 Ramaswamy ........ G06F 16/951 707/756
2016/0328739 A1 11/2016 Synett et al.
2017/0213247 A1 7/2017 Balasubramanian et al.
2017/0293695 A1* 10/2017 Brovman ........... G06Q 30/0251
2018/0095965 A1* 4/2018 DeLuca .............. G06F 16/9535
2018/0357305 A1 12/2018 Kinast et al.
2019/0205939 A1* 7/2019 Lal .................. G06N 3/09
2019/0228084 A1 7/2019 Ishii et al.
2020/0034879 A1 1/2020 Wvai
2020/0126126 A1* 4/2020 Briancon ................ G06F 18/24
2020/0285990 A1 9/2020 Sachdeva et al.

OTHER PUBLICATIONS

Hanna, J. et al., The impact of delivery lead time on customer conversion: Lund University, Faculty of Engineering, Feb. 11, 2020, pp. 1-62.
Hu F. et al., "Recommendation in Web Search Using Similar Query Mining with Big Data," Revista Tecnica de la Facultad de Ingenieria Universidad del Zulia, vol. 39, 2016, pp. 238-243.
Mustufain, R., "Attribution modelling of online advertising," Tampere University, Faculty of Information Technology and Communication Sciences, Apr. 2019, pp. 1-63.
United States Office Action, U.S. Appl. No. 17/486,395, Apr. 4, 2024, 23 pages.
United States Office Action, U.S. Appl. No. 17/486,395, Nov. 30, 2023, 22 pages.

* cited by examiner

PROVIDING SEARCH SUGGESTIONS BASED ON PREVIOUS SEARCHES AND CONVERSIONS

CROSS-REFERENCE TO RELATED APPLICATIONS

This application is a continuation of co-pending U.S. patent application Ser. No. 17/486,395, filed Sep. 27, 2021, which claims the benefit of U.S. Provisional Application No. 63/086,491, filed on Oct. 1, 2020, each of which is incorporated by reference in its entirety.

BACKGROUND

This disclosure relates generally to users placing orders via an online concierge system, and more particularly to an online concierge system leveraging information from previous user search queries to suggest search queries.

In current online concierge systems, shoppers (or "pickers") fulfill orders at a physical warehouse, such as a retailer, on behalf of users as part of an online shopping concierge service. A user adds goods to an online shopping cart from a list of goods offered by one or more retail locations via the online concierge system. These goods create the user's order, which is retrieved by a shopper at the retail location who "shops" for the user.

Conventional online concierge systems receive orders from users and the online concierge systems fill orders for the users. Users enter search terms to search for items. Conventional systems may present items to the user that match the search terms. In response to a user purchasing an item, the systems may suggest additional items for the user to purchase.

SUMMARY

An online concierge system may receive a search query from a customer through an ordering interface. The search query includes one or more search terms for identifying one or more items the customer seeks to purchase via the online concierge system. For example, the online concierge system receives a selection of a warehouse for fulfilling an order from the customer and then receives a search query to identify one or more items offered by the selected warehouse.

To identify items matching one or more of the search terms included in the search query, the online concierge system retrieves an item graph stored by the online concierge system. The item graph comprises a plurality of nodes, with each node corresponding to an item available through the online concierge system or corresponding to an attribute of an item available through the online concierge system.

The online concierge system generates a ranking of candidate nodes based on the search query. Based on the ranking, the online concierge system displays search results including one or more candidate items to the customer. For example, the online concierge system selects candidate nodes having at least a threshold position in the ranking and displays candidate items below the selected candidate nodes in the item graph as the search results.

In response to the search query resulting in a conversion, the online concierge system may retrieve a conversion graph and present suggested subsequent search queries to the customer based on nodes in the conversion graph that are likely to lead to a conversion. In response to the search query not resulting in a conversion, the online concierge system may retrieve a non-conversion graph and present suggested subsequent search queries to the customer based on nodes in the non-conversion graph that are likely to lead to a conversion.

The online concierge system generates the conversion graph and the non-conversion graph using a machine learning search suggestion model. The search suggestion model uses prior conversion data for search queries and conversion data for subsequent search queries as training data to generate the conversion graph and the non-conversion graph.

In some embodiments, a method may comprise an online concierge system receiving a search query from a user. The online concierge system may provide search results for the search query. The online concierge system may determine whether the search query resulted in a conversion. In response to the search query resulting in a conversion, the online concierge system may select a first suggested search query for the user from a conversion graph and provide the first suggested search query to the user. In response to the search query not resulting in a conversion, the online concierge system may select a second suggested search query for the user from a non-conversion graph and provide the second suggested search query to the user.

In some embodiments, a method may comprise receiving, at an online concierge system, a search query including one or more search terms from a customer. The online concierge system may retrieve an item graph comprising item nodes and attribute nodes, wherein each attribute node is connected to a set of item nodes that share an attribute represented by the attribute node. The online concierge system may segment the search query into tokens, each token comprising one or more of the search terms. The online concierge system may identify candidate nodes from the item graph by comparing the tokens to the item graph. The online concierge system may calculate a conversion probability for the search query received from the customer. The online concierge system may calculate a conversion probability for a reformulated search query. The online concierge system may reformulate, in response to the conversion probability for the reformulated search query being greater than the conversion probability for the search query received from the customer, the search query. The online concierge system may select search results from the item graph comprising one or more item nodes based on the reformulated search query. The online system may transmit the search results to a customer device.

In some embodiments, a method may comprise an online concierge system receiving, for each of a plurality of delivery orders, a first search query from a customer. The online concierge system may present first search results for the first search query to the customer. The online concierge system may determine whether the first search query resulted in a first conversion. The online concierge system may receive a second search query from the customer. The online concierge system may present second search results for the second search query to the customer. The online concierge system may determine whether the second search query resulted in a second conversion. The online concierge system may generate a conversion graph based on the plurality of delivery orders for which the first search query resulted in the first conversion. The online concierge system may generate a non-conversion graph based on the plurality of delivery orders for which the first search query did not result in the first conversion.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
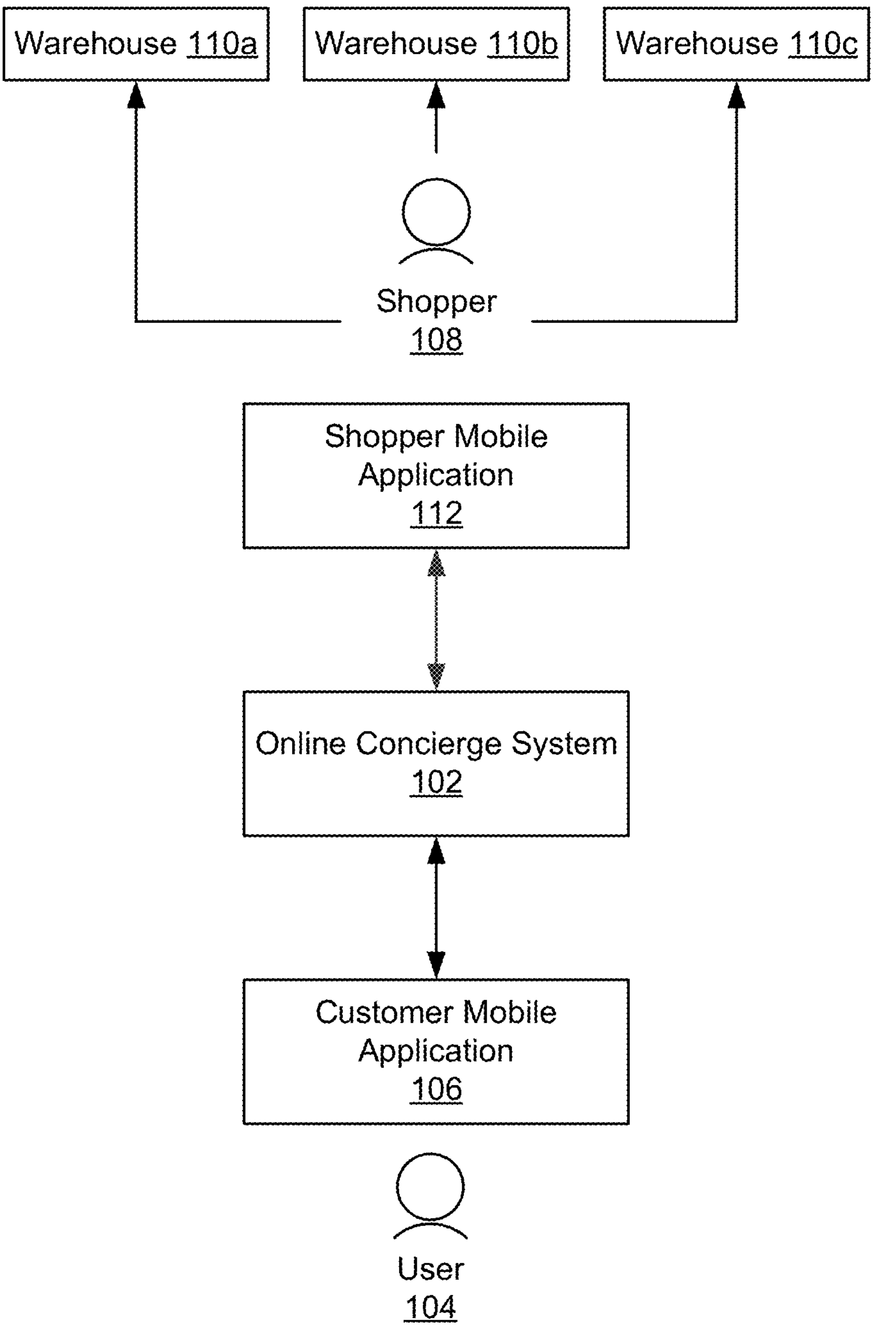
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 on a user device to place the order. The CMA 106 is configured to communicate with the online concierge system 102.

The online concierge system 102 is configured to transmit orders received from users 104 to one or more shoppers 108. A shopper 108 may be a contractor, employee, or other person (or entity) who is enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110*a*, 110*b*, and 110*c* (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
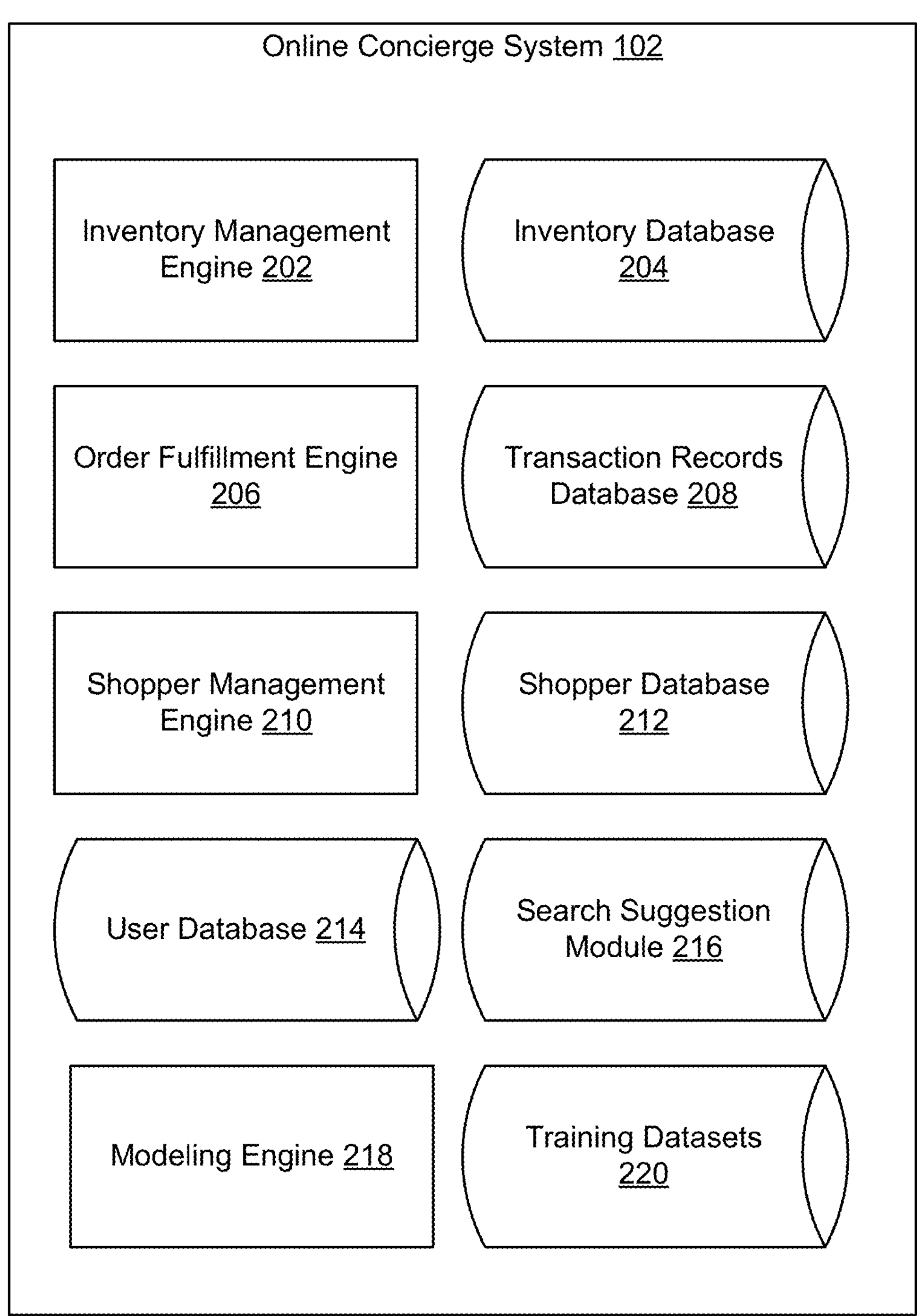
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on. In various embodiments, the user database 214 includes a user profile for each user, with a user profile corresponding to a user including the user's name, address, gender, items included in one or more prior orders, payment instructions, or other information. A user profile corresponding to a user also includes information uniquely identifying the user.

In various embodiments, the order fulfillment engine 206 generates and maintains an item graph, further described below in conjunction with FIGS. 4 and 5. The item graph identifies connections between pairs of items and attributes of items and between pairs of attributes of items. The item graph comprises a hierarchical taxonomy of nodes. A connection between an item node and an attribute node indicates that the item has the attribute to which the item is connected. The attributes of an item may be specified by information describing the product from a warehouse 110 providing the item or determined by the order fulfillment engine 206 based on information about the item received from the warehouse 110. A connection between an attribute node and an additional attribute node may indicate a parent-child relationship between the attribute nodes. For example, an attribute node for a broad category (e.g., "meat") may be connected to a child attribute node (e.g., "pork") that is a subset of the parent attribute node. In various embodiments, a connection between an attribute node and an additional attribute node may indicate that the attribute and the additional attribute have both occurred in one or more previously received orders for items. For example, the attribute node is connected to the additional attribute node if a previously received order included an item having the attribute and having another item having the additional attribute. Similarly, the attribute node is connected to the additional attribute if a previously received order included an item having both the attribute and having the other attribute. As further described below in conjunction with FIG. 4, the order fulfillment engine 206 uses the item graph to suggest subsequent searches in response to a search query received from a customer 104, allowing the order fulfillment engine 206 to leverage information about different attributes and items to increase a likelihood of identifying items and search queries that will lead to conversions.

In various embodiments, the order fulfillment engine 206 generates and maintains a conversion graph and a non-conversion graph, further described below in conjunction with FIGS. 4 and 6. The conversion graph identifies connections between a search query that resulted in conversions and subsequent search queries that resulted in conversions. The non-conversion graph identifies connections between a search query that did not result in a conversion and subsequent search queries that resulted in conversions. A connection between nodes may comprise a weight indicating a likelihood that a subsequent search query will result in a conversion.

In various embodiments, the user database 214 also includes one or more accounts and associations between user profiles and accounts. For example, an account corresponds to a physical location (e.g., an address) and is associated with one or more user profiles. A user may identify an account to the online concierge system 102 as well as other user profiles to associate with the account, and the online concierge system 102 stores associations between the account and other user profiles identified by the user. In various embodiments, the account includes a physical location (e.g., an address), delivery instructions for orders identifying the physical location, and other information for the physical location. The order fulfillment engine 206 may leverage associations between different user profiles and the account to retrieve information about previously received orders from multiple users with user profiles associated with the account. This allows the order fulfillment engine 206 to provide a user with a user profile associated with the account with items that other users with other user profiles associated with the account included in previously received orders, providing a user with a user profile associated with the account with additional recommendations for items to include in an order created by the user.

Machine Learning Model

The online concierge system 102 further includes a search suggestion model 216, a modeling engine 218, and training datasets 220. The search suggestion model 216 may comprise a machine-learned search suggestion model. The modeling engine 218 uses the training datasets 220 to generate the search suggestion model 216. The search suggestion model 216 can learn from the training datasets 220, rather than follow only explicitly programmed instructions. The inventory management engine 202, order fulfillment engine 206, and/or shopper management engine 210 can use the search suggestion model 216 to suggest a search query for a user based on a likelihood that the search query will result in a conversion and/or a frequency of a search query being entered after a previous search query. The search suggestion model 216 may be used to predict conversions for items being displayed to or suggested to a user.

The search suggestion model 216 can be configured to receive as inputs previous conversion data for users who entered search terms, as well as subsequently entered search queries after an initial search query. The search suggestion model 216 may be adapted to receive any information that the modeling engine 218 identifies as indicators affecting the likelihood of a conversion for search terms. The search suggestion model 216 may receive information about an item-query pair, such as an item in a delivery order and a subsequent search query that resulted in a conversion. Items stored in the inventory database 204 may be identified by item identifiers. In various embodiments, various attributes, some of which are specific to the warehouse (e.g., a time that the item was last found in the warehouse, a time that the item was last not found in the warehouse, the rate at which the item is found, the popularity of the item), may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. Based on the identifier(s), the online concierge system 102 can extract information about the item and/or warehouse from the inventory database 204 and/or warehouse database and provide this extracted information as inputs to the search suggestion model 216.

The search suggestion model 216 contains a set of functions generated by the modeling engine 218 from the training datasets 220 that relate the item, warehouse, search terms, sequence of search terms, conversion data, and/or any other relevant inputs, to the probability that the items presented for a search query will result in a conversion. Thus, for a given search query, the search suggestion model 216 outputs a probability that suggested subsequent search queries will result in a conversion. In some embodiments, for a given search query, the search suggestion model 216 outputs the frequency of subsequently entered search queries. In some embodiments, the probability output by the search suggestion model 216 includes a confidence score. The confidence score may be the error or uncertainty score of the output conversion probability and may be calculated using any standard statistical error measurement. In some examples, the confidence score is based in part on whether the conversion prediction was accurate for previous search queries (e.g., if the search query was predicted to lead to a conversion but did not result in a conversion, or predicted to not lead to a conversion but did result in a conversion). The set of functions of the search suggestion model 216 may be updated and adapted following retraining with new training datasets 220. The search suggestion model 216 may be any machine learning model, such as a neural network, boosted tree, gradient boosted tree or random forest model. In some examples, the search suggestion model 216 is generated from XGBoost algorithm.

The search suggestion model 216 may comprise one or more graphs having a taxonomy organized hierarchically. The graph may comprise high level nodes which describe a broad item category, such as "meat" or "fruit." The graph may comprise one or more levels of intermediate nodes which further describe an item, such as "apples" or "oranges." The graph may comprise nodes which represent a specific SKU or item available for purchase, such as "Five pound bag of Fuji apples." The graph may comprise edges between nodes that indicate a frequency with which a user who entered a search query matching a first node subsequently entered a search query matching a second node. The search suggestion model 216 may store a conversion query graph representing subsequent search queries after a search query resulted in a conversion, and a non-conversion query graph representing subsequent search queries after a search query did not result in a conversion.

The search suggestions generated by the search suggestion model 216 may be used to display search suggestions to the user 104, as described in further detail below.

The training datasets 220 relate a variety of different factors to known search queries from the outcomes of previous search queries (e.g., given a first search query, whether a second search query led to a conversion). The training datasets 220 include previous initial search queries, whether the initial search queries resulted in a conversion, subsequent search queries after the initial search query, whether the subsequent search queries resulted in a conversion, and a variety of characteristics associated with each of the search queries. Each piece of data in the training datasets 220 includes the outcome of a previous search query (e.g., if the search query resulted in a conversion or not). The search query characteristics may be determined by the search suggestion model 216 to be statistically significant factors predictive of the search query's conversion probability. For different search queries, the item characteristics that are predictors of conversion probability may be different. For each item, the search suggestion model 216 may weight these factors differently, where the weights are a result of a "learning" or training process on the training datasets 220. The training datasets 220 are very large datasets taken across a wide cross section of search queries, shoppers, items, warehouses, delivery orders, times and item characteristics. The training datasets 220 are large enough to provide a mapping from a search query to a probability that the search query will result in a conversion.

Machine Learning Factors

The training datasets 220 include associations between search terms entered by a customer, subsequent search terms, and conversions resulting from the subsequent search terms. The subsequent search terms may comprise subsequent search terms entered by the customer or a reformulated search query generated by the online concierge system 102. The data in the training datasets 220 is labeled based on whether or not, for initial search terms entered by a customer, subsequent search terms resulted in a conversion to produce a labeled set of training data. The online concierge system 102 trains the search suggestion model 216 using the set of training data. The system applies the model to future search queries to determine a probability of whether a suggested subsequent search query will lead to a conversion.

The training datasets 220 may include search terms that did not return any results and subsequent search terms entered by a customer. The training datasets 220 may indicate whether the subsequent search terms resulted in a conversion. For example, if the search terms "crumbled feta cheese" did not provide any results, the training datasets 220 may indicate whether subsequent searches for "crumbled cheese" or "feta cheese" resulted in a conversion. The training datasets 220 may also identify which specific items were purchased in response to the subsequent search terms.

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders.

The training datasets 220 include item characteristics. In some embodiments, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs."

The training datasets 220 may include additional item characteristics that relate to search queries entered by a user and can therefore be used to build the search suggestion model 216 relating the suggested search queries after a previous search query. The training datasets 220 may be periodically updated with recent search query and conversion data. Following updating of the training datasets 220, a modeling engine 218 may retrain a model with the updated training datasets 220 and produce a new search suggestion model 216.

Customer Mobile Application

Figure 3A:
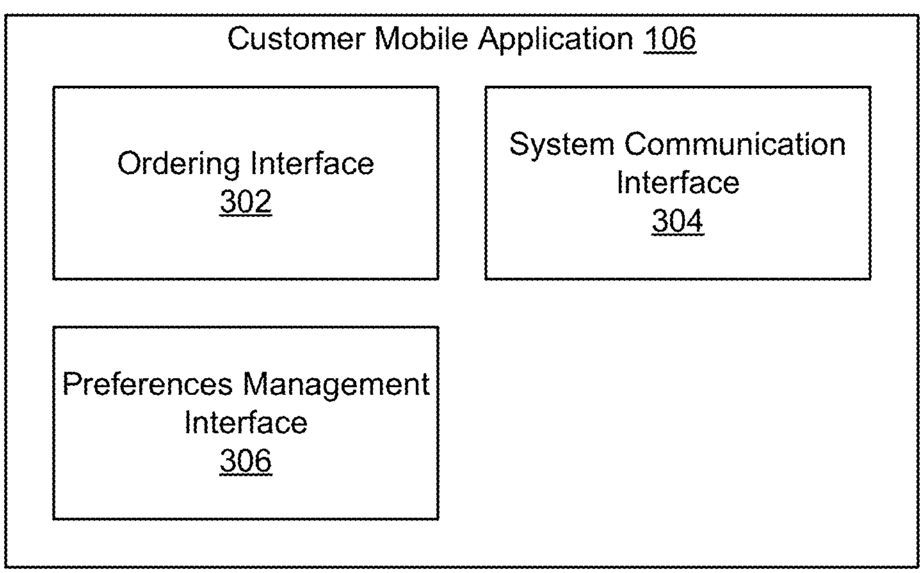
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The ordering interface 302 provides a search query interface for the customer to enter a search query. The ordering interface 302 may display a suggested search query based on the search query entered by the customer. The ordering interface 302 displays items corresponding to item nodes from the item graph as results to the search query. The customer may select an item to order a specific item. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, etc.

Shopper Mobile Application

Figure 3B:
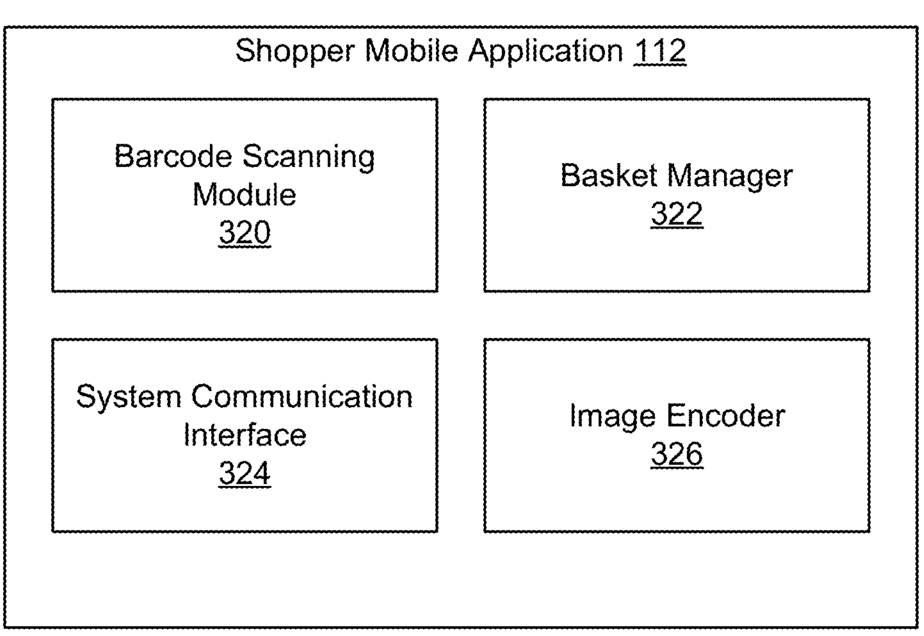
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Use Case Examples

Figure 4:
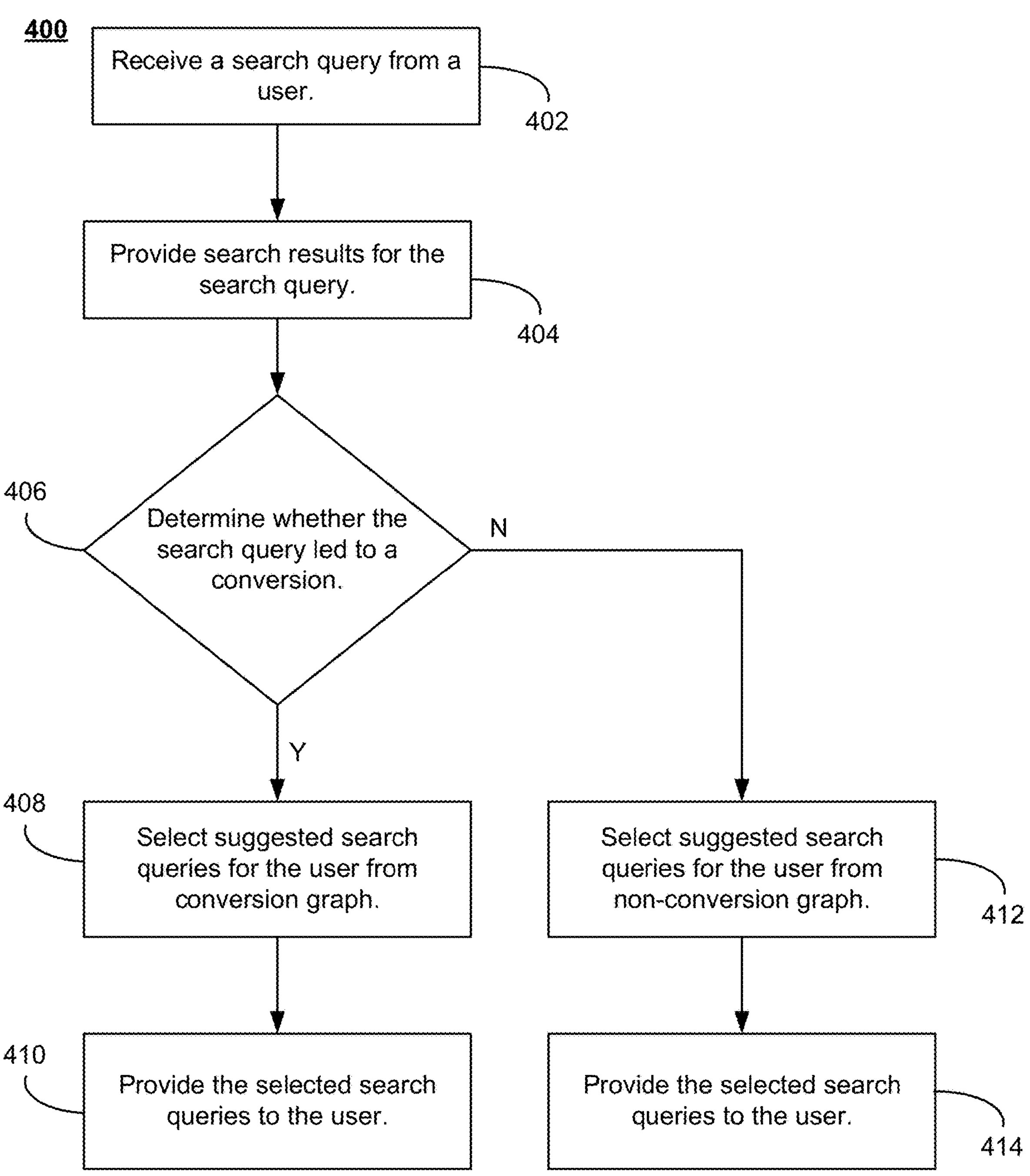
FIG. 4 is a flowchart of a process for suggesting search queries based on previous search queries and whether the previous search query resulted in a conversion, according to one embodiment.

FIG. 4 illustrates an example process 400 for suggesting search queries based on previous search queries and whether the previous search query resulted in a conversion. The online concierge system 102 receives 402 a search query from a user. The search query includes one or more words input by the user.

The online concierge system 102 provides 404 search results for the search query. The search results comprise one or more items or categories of items that the online concierge system 102 predicts will lead to a conversion by the user. The search results may be presented in a user interface on a user's device.

The online concierge system 102 determines 406 whether the search query led to a conversion. In some embodiments, a conversion may comprise the user placing an item in an online shopping cart or purchasing an item. The online concierge system 102 may determine that the search query led to the conversion if the user places a search result item into the online shopping cart.

In response to the search query leading to a conversion, the online concierge system 102 selects 408 suggested search queries for the user from a conversion query graph. The suggested search queries may represent search queries that previous users entered after a conversion resulting from the same search query as the user. For example, if the user searches for "salmon," and places a search result item into the online shopping cart, the online concierge system 102 may identify search queries input by previous users who searched for "salmon" and purchased a search result item. The suggested search results may comprise complementary items to the search query which resulted in a conversion. For example, if the user places a search result item into the online shopping cart after searching for "salmon," the suggested search queries may comprise complementary items such as dill, lemon, or garlic. The online concierge system 102 may retrieve the suggested search queries from a graph describing the frequency of search queries after a previous search query resulted in a conversion, such as a graph stored by search suggestion module 216.

The online concierge system 102 provides 410 the suggested search queries to the user. In some embodiments, the suggested search queries may be displayed as auto-fill options in a search field in response to the user selecting or typing in the search field. In some embodiments, the suggested search queries may be displayed in any suitable location on the webpage, such as above, below, or in line with search result items. In response to the user selecting the suggested search query, the online concierge system 102 may input the suggested search query to an item graph to retrieve candidate items to display to the customer.

In response to the search query not leading to a conversion, the online concierge system 102 selects 412 suggested search queries for the user from a non-conversion query graph. The suggested search queries may represent search queries that previous users entered after the same search query did not result in a conversion for the previous users. For example, if the user searches for "salmon," and does not place a search result item into the online shopping cart, the online concierge system 102 may identify search queries input by previous users who searched for "salmon" and did not purchase a search result item. The online concierge system 102 may determine that the search query did not result in a conversion after a time period expires without the user placing a search result item into the digital shopping cart, or in response to the user typing or selecting a search field to initiate a new search. The suggested search results may comprise substitute items to the search query which did not result in a conversion. For example, if the user does not place a search result item into the online shopping cart after searching for "salmon," the suggested search queries may comprise substitute items such as halibut, tuna, or trout. The online concierge system 102 may retrieve the suggested search queries from a graph describing the frequency of search queries after a previous search query did not result in a conversion, such as a graph stored by search suggestion module 216.

The online concierge system 102 provides 414 the suggested search queries to the user. In some embodiments, the suggested search queries may be displayed as auto-fill options in or adjacent to a search field in response to the user selecting or typing in the search field. In some embodiments, the suggested search queries may be displayed in any suitable location on the webpage, such as above, below, or in line with search result items. In response to the user selecting the suggested search query, the online concierge system 102 may input the suggested search query to an item graph to retrieve candidate items to display to the customer.

Figure 5:
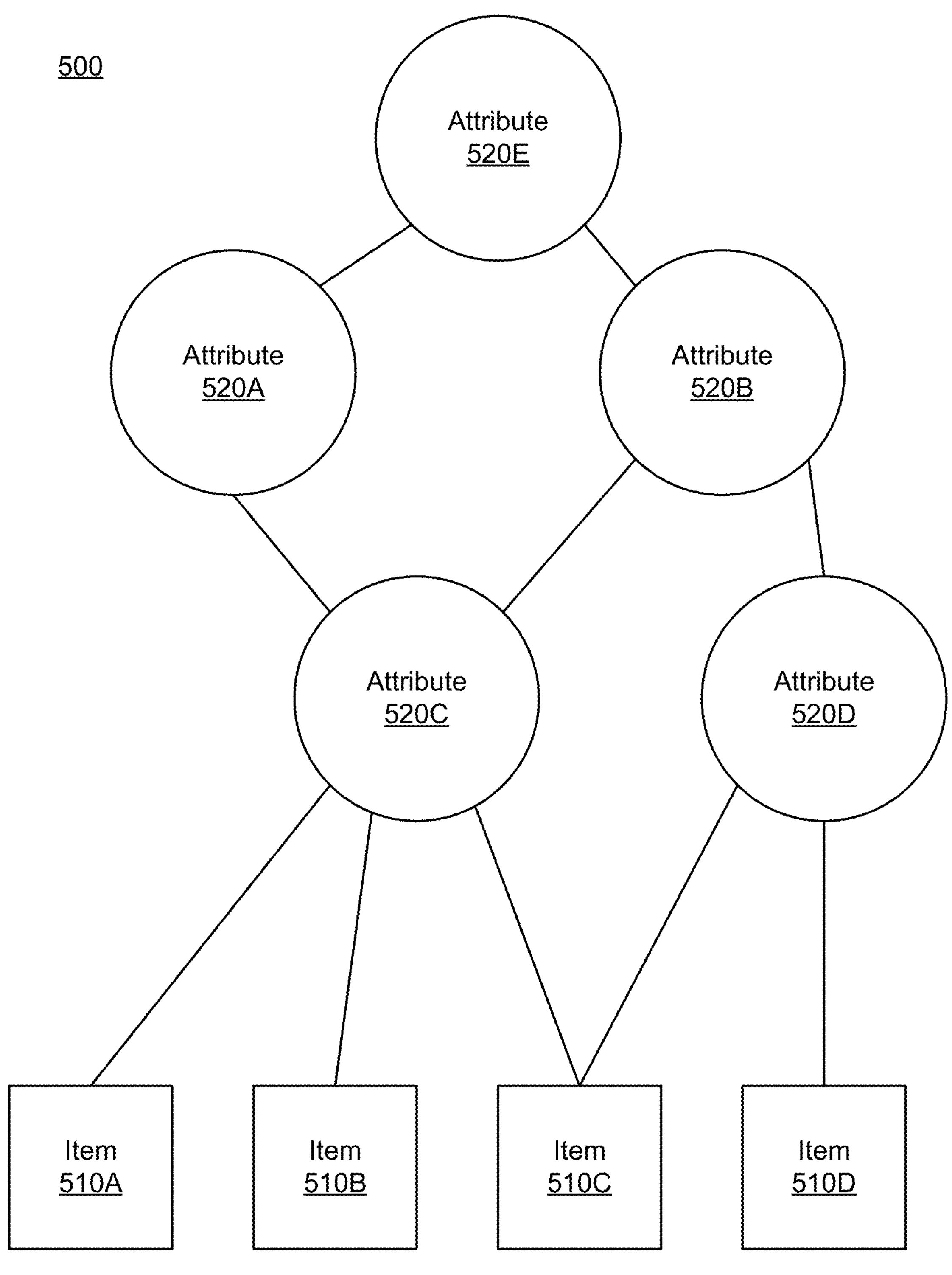
FIG. 5 is an example of an item graph maintained by an online concierge system, according to one embodiment.

FIG. 5 shows an example item graph 500 maintained by the online concierge system 102. The item graph 500 may be an embodiment of the item graphs described with respect to FIG. 2. As further described above in conjunction with FIG. 2, the item graph includes item nodes representing items offered by the online concierge system 102 and attribute nodes representing attributes of the items, along with connections between nodes. In the example of FIG. 5, the item graph 500 includes item node 510A, item node 510B, item node 510C, and item node 510D (also referred to individually and collectively using reference number 510). The item graph 500 also includes attribute node 520A, attribute node 520B, attribute node 520C, attribute node 520D, and attribute node 520E (also referred to individually and collectively using reference number 520). In various embodiments, the item graph 500 may comprise large numbers of item nodes, attribute nodes, and hierarchical levels of nodes. However, only a small subset of an item graph is displayed in FIG. 5 for ease of illustration. A connection between an item node 510 and an attribute node 520 in the item graph 500 indicates that the item of item node 510 has the attribute of attribute node 520 based on information about the items obtained by the online concierge system 102. As illustrated, item node 510A is connected to attribute node 520C, indicating that the item of item node 510A has the attribute of attribute node 520C. Similarly, item node 510C is connected to attribute node 520C and attribute node 520D because the item of item node 510C has the attributes of attribute node 520C and attribute node 520D.

Connections between item nodes 510 and attribute nodes 520 are based on information about items obtained by the online concierge system 102. For example, the online concierge system 102 receives a product catalog from a warehouse 110 identifying items offered for purchase by the warehouse 110. Each entry in the product catalog includes information identifying an item and one or more attributes associated with the item. The online concierge system 102 generates the item graph 500 so the item node 510 has a connection to each attribute node 520 associated with the item by the product catalog. Additionally, attributes of an item 510 may be specified by the online concierge system 102, such as one or more categories or descriptions associated with the item by the online concierge system 102, with the item graph 500 establishing connections between the item nodes 510 and attribute nodes for the item specified by the online concierge system 102.

The item graph 500 includes connections between various pairs of nodes. A connection between an item node 510 and an attribute node 520 indicates that the attribute is associated with the item. The item graph 500 are arranged in a hierarchical taxonomy of items. A parent attribute node, such as attribute node 520B, may be connected to one or more child attribute nodes, such as attribute node 520C and attribute 520D, at a lower level of the taxonomy. For example, a "dairy" attribute node may be connected to lower level attribute nodes for "butter," "milk," "eggs," etc. Similarly, attribute node 520C is connected to child item nodes for specific items that contain the attribute. Additionally, a child attribute node or child item node may be connected to one or more parent nodes at a higher level of the taxonomy. As illustrated, attribute node 520C is connected to parent attribute node 520A and parent attribute node 520B. For example, an attribute node for "eggs" may be connected to higher level nodes for "dairy," "baking ingredients," "breakfast items," etc.

The online concierge system 102 generates the item graph 500 based on a product catalog received from the warehouse 110, where each entry in the product catalog includes information identifying an item (e.g., an item identifier, an item name) and one or more attributes of the item. Example attributes of an item include: one or more keywords, a brand offering the item, a manufacturer of the item, a type of the item, and any other suitable information. Additionally, one or more attributes of an item may be specified by the online concierge system 102 for the item. Example attributes specified by the online concierge system 102 for an item include: a category for the item, one or more sub-categories for the item, and any other suitable information for the item. Attributes specified by the online concierge system 102 have corresponding attribute nodes that are connected to an item node for the item in the item graph.

In various embodiments, a connection between nodes in the item graph includes one or more values representing a measure of connectedness between the pair of nodes that are connected. The value included in a connection between nodes is based on based on prior customer actions when ordering items from the online concierge system 102. For example, a value of a connection between an attribute node 520 and an item node 510 may be based on a frequency with which customers purchase the item after entering a search query which is mapped to the attribute node 520. A value of a connection between a first attribute node 520 and a second attribute node 520 may be based on a frequency with which a first item having the first attribute is included in an order by a customer along with a second item having the second attribute. As another example, the value of the connection between the first attribute node 520 and the second attribute node 520 may be based on a number of times a first item having the first attribute is included in an order by a customer along with a second item having the second attribute. In another example, the value of the connection between the first attribute node 520 and the second attribute node 520 is determined from a number of times (or a frequency with which) previously received orders included an item having both the first attribute and the second attribute. The online concierge system 102 modifies the measure of connectedness between nodes in the item graph over time as customers include items connected to various attribute nodes 520 in orders received by the online concierge system 102. This allows the online concierge system 102 to maintain information identifying relationships between different attributes of items as well relationships between attributes and items based on items included in orders previously received by the online concierge system 102 and information about items received by the online concierge system 102.

Figure 6:
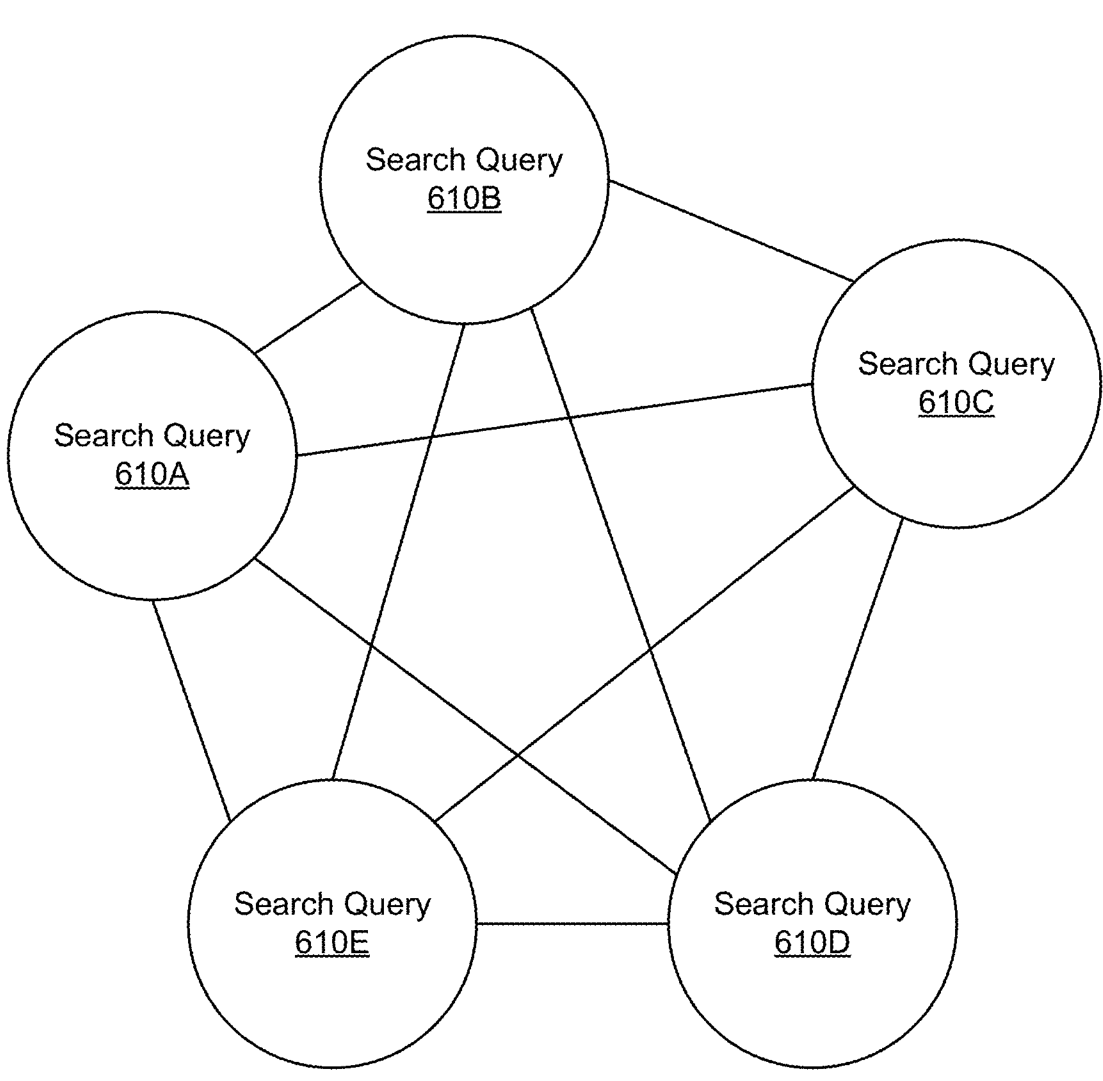
FIG. 6 is an example conversion graph, according to one embodiment.

FIG. 6 shows an example conversion graph 600 maintained by the online concierge system 102. The conversion graph 600 may be an embodiment of the conversion graphs described with respect to FIG. 2 and FIG. 4. The online concierge system 102 may retrieve the conversion graph 600 to suggest a subsequent search query in response to an initial search query resulting in a conversion. The conversion graph 600 includes search query nodes representing search queries input to the online concierge system 102, along with connections between nodes. In the example of FIG. 6, the conversion graph 600 includes search query node 610A, search query node 610B, search query node 610C, and search query node 610D (also referred to individually and collectively using reference number 610). In various embodiments, the conversion graph 600 may comprise large numbers of search query nodes. However, only a small subset of a conversion graph is displayed in FIG. 6 for ease of illustration. A connection between search query nodes 610 in the conversion graph 600 may comprise a weight indicating a likelihood of conversion for a subsequent search query based on information about the search queries obtained by the online concierge system 102.

In various embodiments, a connection between nodes in the conversion graph includes one or more values representing a measure of connectedness between the pair of nodes that are connected. The value included in a connection between nodes is based on based on prior customer actions when ordering items from the online concierge system 102. For example, a value of a connection between two search query nodes 610A and 610B may be based on a frequency with which, when a search query corresponding to search query node 610A resulted in a conversion, a subsequent search query corresponding to search query node 610B resulted in a conversion. The online concierge system 102 modifies the measure of connectedness between nodes in the conversion graph over time as subsequent search queries result in conversions in orders received by the online concierge system 102.

In addition to the conversion graph 600, the online concierge system 102 may maintain a non-conversion graph. The non-conversion graph may be an embodiment of the non-conversion graphs described with respect to FIG. 2 and FIG. 4. The online concierge system 102 may retrieve the non-conversion graph to suggest a subsequent search query in response to an initial search query not resulting in a conversion. Similarly to the conversion graph 600, the non-conversion graph may comprise search query nodes similar to search query nodes 610 and connection between nodes. A value of a connection between two search query nodes may be based on a frequency with which, when a search query corresponding to a first search query node did not result in a conversion, a subsequent search query corresponding to a second search query node resulted in a conversion.

Figure 7:
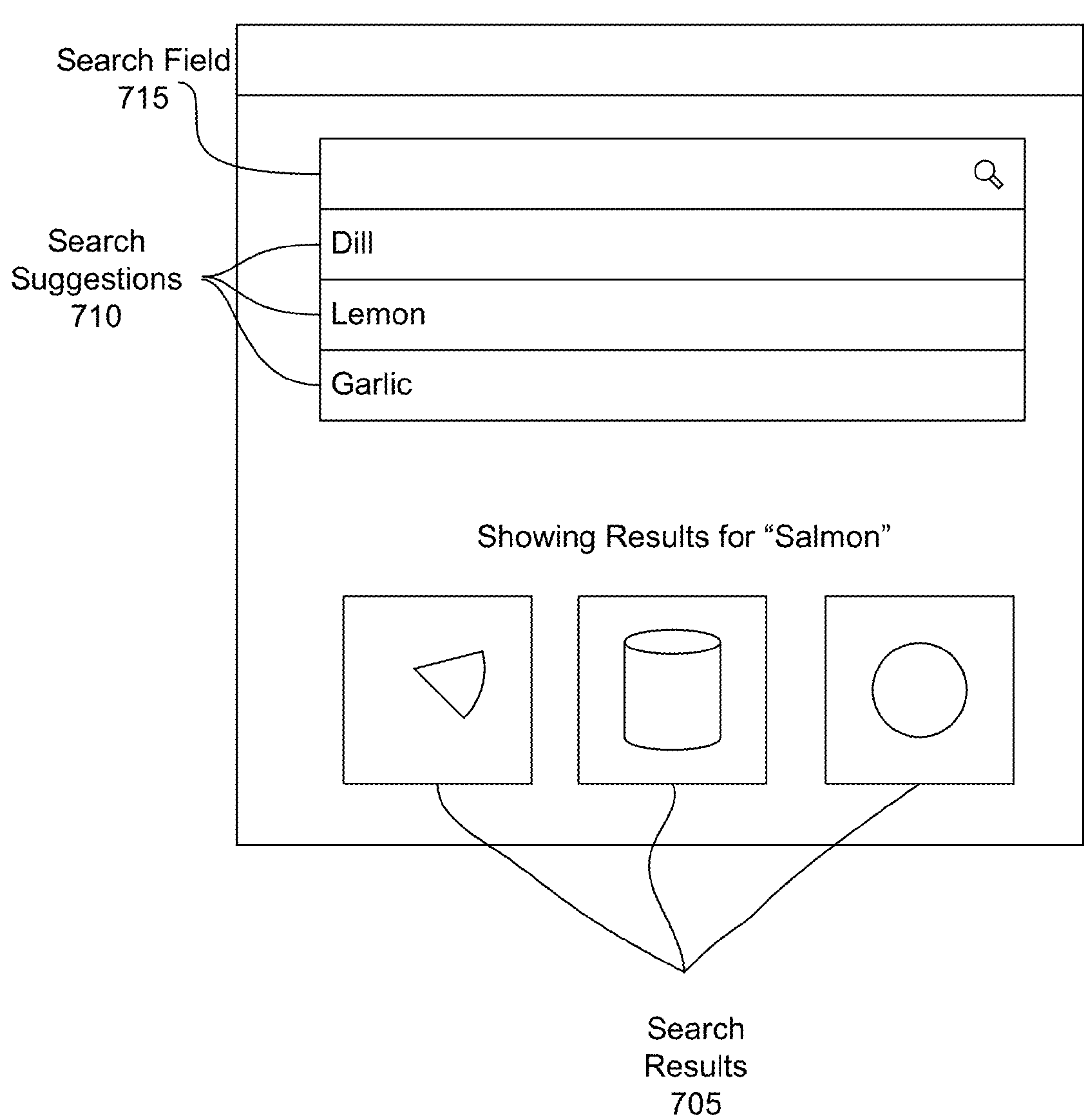
FIG. 7 is an example interface including search query suggestions, according to one embodiment.

FIG. 7 illustrates an example interface 700 displayed by a customer mobile application 106 including suggested search queries. In the example of FIG. 7, the interface 700 includes search results 705 for a search query for "salmon." Additionally, the interface 700 includes search suggestions 710 which are displayed on the interface 700. The search suggestions 710 are shown as autofill options for a search field 715. The search suggestions 710 may be displayed below the search field 715 in response to the user selecting or typing into the search field 715. The search suggestions 710 illustrated in interface 700 are selected based the user adding one of the search results 705 into an online shopping cart (i.e., a conversion). However, if the search results 705 had not resulted in a conversion, the interface may have displayed different search suggestions 710, as described with respect to FIG. 4.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

for each of a plurality of delivery orders:

receiving, by an online concierge system, a first search query from a customer;

presenting, by the online concierge system, first search results for the first search query to the customer;

determining, by the online concierge system, that the first search query resulted in a first conversion;

receiving, by the online concierge system, a second search query from the customer; and presenting, by the online concierge system, second search results for the second search query to the customer;

generating, by the online concierge system, a conversion graph based on the plurality of delivery orders, wherein the conversion graph is generated using a search suggestion model, wherein generating the conversion graph comprises:

adding, to the conversion graph comprising a plurality of search query nodes, a first search query node representing a first search query in an order and a second search query node representing a second search query in the same order;

adding a connection between the first query node and the second search query node; and associating a weight with the connection between the first search query node and the second search query node, wherein the weight is based on a likelihood of an interaction with the second search query following the first query that results in a conversion; and selecting, by the online concierge system, based on the conversion graph, a suggested search query for a user of a new delivery order, when a search query in the new delivery order resulted in a conversion, comprising:

automatically adding an interface element for autofilling a suggested search query for the new delivery order in a user interface displayed by a user device, arranging the added interface element next to a second interface element, the second interface element comprising a search field that receives search queries from the user, and displaying the suggested search query in the interface element;

wherein the search suggestion model comprises a machine learning model that is trained using conversion data for initial search queries and conversion data for subsequently entered search queries, wherein training the machine learning model comprises:

training the machine learning model using previous delivery orders, initiating conversion data related to subsequent search queries in the previous delivery orders resulted in conversions, updating, the machine learning model, with the subsequent search queries and the conversion data, and retraining the machine learning model with updated trained datasets to produce a new search suggestion model.

2. The method of claim 1, wherein the interaction with the second search query is a conversion on one of the second search results of the second search query.

3. The method of claim 1, wherein determining the weight of the connection comprises:

determining a frequency of the second search query resulting in a second conversion following the first query that results in a first conversion.

4. The method of claim 1, wherein determining the weight of the connection comprises:

determining one or more values representing a measure of connectedness between the first search query node and the second search query node.

5. The method of claim 1, wherein determining that the first search query resulted in a first conversion comprises determining that the customer placed an item in the first search results into a shopping cart.

6. The method of claim 1, further comprising:

inputting, by the online concierge system, the first search query to an item graph.

7. A computer program product comprising a non-transitory computer readable storage medium having instructions encoded thereon that, when executed by a processor, cause the processor to:

for each of a plurality of delivery orders:

receive a first search query from a customer;

present first search results for the first search query to the customer;

determine that the first search query resulted in a first conversion;

receive a second search query from the customer; and present second search results for the second search query to the customer;

generate a conversion graph based on the plurality of delivery orders, wherein the conversion graph is generated using a search suggestion model, wherein generating the conversion graph comprises:

adding, to the conversion graph comprising a plurality of search query nodes, a first search query node representing a first search query in an order and a second search query node representing a second search query in the same order;

adding a connection between the first query node and the second search query node; and associating a weight with the connection between the first search query node and the second search query node, wherein the weight is based on a likelihood of an interaction with the second search query following the first query that results in a conversion; and select based on the conversion graph, a suggested search query for a user of a new delivery order, when a search query in the new delivery order resulted in a conversion, comprising:

automatically adding an interface element for autofilling a suggested search query for the new delivery order in a user interface displayed by a user device, arranging the added interface element next to a second interface element, the second interface element comprising a search field that receives search queries from the user, and displaying the suggested search query in the interface element;

wherein the search suggestion model comprises a machine learning model that is trained using conversion data for initial search queries and conversion data for subsequently entered search queries, wherein training the machine learning model comprises:

training the machine learning model using previous delivery orders, initiating conversion data related to subsequent search queries in the previous delivery orders resulted in conversions, updating, the machine learning model, with the subsequent search queries and the conversion data, and retraining the machine learning model with updated trained datasets to produce a new search suggestion model.

8. The computer program product of claim 7, wherein the interaction with the second search query is a conversion on one of the second search results of the second search query.

9. The computer program product of claim 7, wherein the instructions to determine the weight of the connection further cause the processor to:

determine a frequency of the second search query resulting in a second conversion following the first query that results in a first conversion.

10. The computer program product of claim 7, wherein the instructions to determine the weight of the connection further cause the processor to:

determine one or more values representing a measure of connectedness between the first search query node and the second search query node.

11. The computer program product of claim 7, wherein the instructions to determine that the first search query resulted in a first conversion further cause the processor to determine that the customer placed an item in the first search results into a shopping cart.

12. The computer program product of claim 7, wherein the instructions further cause the processor to:

input the first search query to an item graph.

13. A method comprising:

receiving, by an online concierge system, a first search query from a customer;

presenting, by the online concierge system, first search results for the first search query to the customer;

determining, by the online concierge system, that the first search query resulted in a first conversion;

selecting, by the online concierge system, a suggested search query for the customer from a conversion graph based on a plurality of delivery orders, wherein the conversion graph is generated using a search suggestion model, wherein the conversion graph is generated by:

adding, to the conversion graph comprising a plurality of search query nodes, a first search query node representing a first search query in an order and a second search query node representing a second search query in the same order;

adding a connection between the first query node and the second search query node; and associating a weight with the connection between the first search query node and the second search query node, wherein the weight is based on a likelihood of an interaction with the second search query following the first query that results in a conversion; and providing, by the online concierge system, the suggested search query to the customer, wherein providing the suggested search query to the customer comprises:

automatically adding an interface element for autofilling the suggested search query in a user interface displayed by a user device, arranging the added interface element next to a second interface element, the second interface element comprising a search field that receives search queries from the customer, and displaying the suggested search query in the interface element in an order based on a frequency of the suggested search query resulting in a conversion;

wherein the search suggestion model comprises a machine learning model that is trained using conversion data for initial search queries and conversion data for subsequently entered search queries, wherein training the machine learning model comprises:

training the machine learning model using previous delivery orders, initiating conversion data related to subsequent search queries in the previous delivery orders resulted in conversions, updating, the machine learning model, with the subsequent search queries and the conversion data, and retraining the machine learning model with updated trained datasets to produce a new search suggestion model.

14. The method of claim 13, wherein the interaction with the second search query is a conversion on one of the second search results of the second search query.

15. The method of claim 13, wherein determining the weight of the connection comprises:

determining a frequency of the second search query resulting in a second conversion following the first query that results in a first conversion.

16. The method of claim 13, wherein determining the weight of the connection comprises:

determining one or more values representing a measure of connectedness between the first search query node and the second search query node.

17. The method of claim 13, wherein determining that the first search query resulted in a first conversion comprises determining that the customer placed an item in the first search results into a shopping cart.

* * * * *